United States Patent [19]

Inaba et al.

[11] Patent Number: 4,861,674

[45] Date of Patent: Aug. 29, 1989

[54] MAGNETIC RECORDING MEDIUM

[75] Inventors: Hiroo Inaba; Akira Ushimaru; Nobuyuki Yamamoto; Noburo Hibino; Kenzo Iwamoto, all of Kanagawa, Japan

[73] Assignee: Fuji Photo Film Co., Ltd., Kanagawa, Japan

[21] Appl. No.: 238,067

[22] Filed: Aug. 30, 1988

[30] Foreign Application Priority Data

Aug. 31, 1987 [JP] Japan ................... 62-218730

[51] Int. Cl.$^4$ ............................... G11B 5/70
[52] U.S. Cl. .................... 428/480; 428/694; 428/900
[58] Field of Search .............. 428/480, 694, 900

[56] References Cited

U.S. PATENT DOCUMENTS 4,680,217  7/1987  Kanesaki et al. ............... 428/480
4,710,421 12/1987  Ono et al. ..................... 428/480
4,767,657  8/1988  Sakamoto et al. ............... 428/694
4,781,964 11/1988  Mizuno et al. .................. 428/694

Primary Examiner—Paul J. Thibodeau
Attorney, Agent, or Firm—Sughrue, Mion, Zinn, Macpeak & Seas

[57] ABSTRACT

A magnetic recording medium is disclosed, which comprises a non-magnetic support having coated thereon a magnetic layer, said non-magnetic support being a film substantially composed of polyethylene terephthalate and having a cutting index (Z) of 6 or less as defined by equation(1):

$$Z = 383.3 - 2.76A - 2000B + 840\Delta n \quad (1)$$

wherein A is the haze value, B is the surface orientation coefficient represented by $\{(n_{MD}+n_{TD})/2\} - n_{ZD}$, $n_{MD}$ is the refractive index in the machine direction, $n_{TD}$ is the refractive index in the transverse direction, $n_{ZD}$ is the refractive index in the thickness direction, and $\Delta n$ is the difference of the refractive indices represented by $n_{MD} - n_{TD}$; and said magnetic layer has yield elongation (L) of 10% or lower and requires energy (E) of 1.0 kg/mm$^2$ or less to reach the yield point.

9 Claims, 1 Drawing Sheet

FIGURE

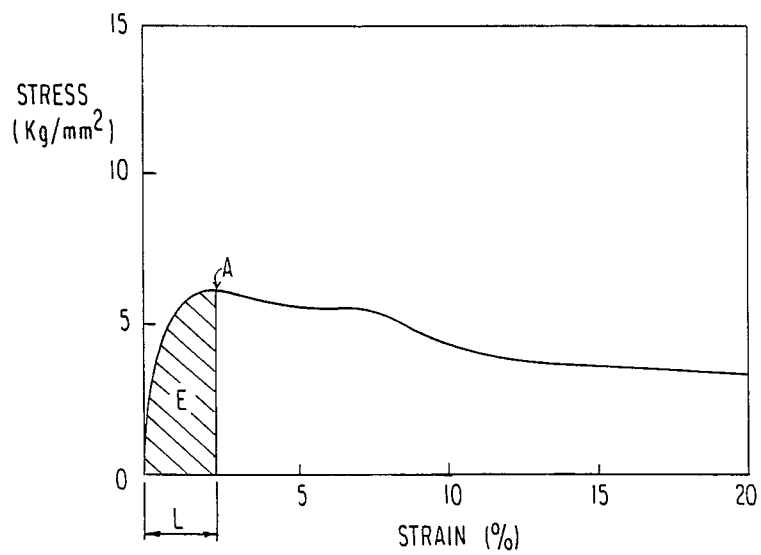
FIGURE

MAGNETIC RECORDING MEDIUM

FIELD OF THE INVENTION

The present invention relates to a magnetic recording medium, and more particularly to a magnetic recording medium which is easily cut without generating powder-off and which has a smooth cut surface.

BACKGROUND OF THE INVENTION

Generally, magnetic recording media in the shape of a tape are widely used (often herein simply a "magnetic tape"). Such a tape shaped magnetic recording medium is prepared by coating a magnetic coating composition containing ferromagnetic particles on a surface of a non-magnetic support such as a polyester film, providing magnetic orientation thereto, drying, calendering and cutting to the desired width.

If a cut surface of a tape breaks off, cracks or has powders attached thereto (dust from cutting the tape, hereafter merely referred to as "dust"), powder-off and edge damage are likely to occur, causing dropouts and, as a result, greatly decreasing the commercial acceptability of the magnetic recording medium. Accordingly, upon preparing a magnetic recording medium, it is very important to finish the cut surface of a tape very neatly.

A shear cutting method using an edged tool of e.g., super-hard alloy including tungsten carbide (hereinafter often referred to as "a knife") as described in Japanese Patent Publication Nos. 4635/86 and 39275/84 and Japanese Patent Application (OPI) No. 202385/87 is generally employed for cutting a magnetic recording medium, and a knife elaborate enough to cut the medium into ½ inch width only with variation of ±10 μm or smaller is used. (The term "OPI" as used herein means an "unexamined published Japanese patent application") Various improvements have been proposed for such cutting devices. However, recently, a highly smooth cut surface is required for magnetic recording media with a tape shape, but improvements as to cutting methods and devices have not yet satisfactorily responded to the requirements of the art.

With a conventional cutting process, it is unavoidable that the edge of a knife wears out and it is necessary to regularly grind the edge of the knife or change the knife. Therefore, knife wear should be reduced as much as possible to increase the production efficiency of magnetic recording media with a tape shape.

SUMMARY OF THE INVENTION

An object of the present invention is to provide a magnetic recording medium with a tape shape cut by a shear cutting method, which has a smooth cut surface without coming off of powder, edge damage and drop out and which has excellent electromagnetic characteristics and running durability.

Another object of the present invention is to provide a magnetic recording medium with a tape shape cut by a knife which is free from wear and, accordingly, can be continuously used for a long period of term, thus increasing production efficiency.

As a result of extensive studies on the cutting properties of magnetic recording media, it has been found that the above objects can be accomplished by a magnetic recording medium comprising a non-magnetic support having particular properties and a magnetic layer thereon having particular properties, in combination.

This invention is a magnetic recording medium comprising a non-magnetic support having coated thereon a magnetic layer, the non-magnetic support being a film substantially composed of polyethylene terephthalate and having a cutting index (Z) of 6 or lower as defined by equation (1):

$$Z = 383.3 - 2.76A - 2000B + 840\Delta n \quad (1)$$

wherein A is the haze value, B is the surface orientation coefficient represented by $\{(n_{MD} + n_{TD})/2\} - n_{ZD}$, $n_{MD}$ is the refractive index in the machine direction, $n_{TD}$ is the refractive index in the transverse direction, $n_{ZD}$ is the refractive index in the thickness direction, and $\Delta n$ is the difference of refractive indices represented by $n_{MD} - n_{TD}$;

and the magnetic layer has yield elongation (L) of 10% or lower and the energy (E) to reach the yield point is 1.0 kg/mm² or less.

BRIEF EXPLANATION OF A DRAWING

The figure is a stress-and-strain curve showing the stress-and-strain characteristics of a magnetic layer of the magnetic recording medium of this invention, wherein point A is the yield point, L is the yield elongation and E area is an energy needed to reach the yield point.

DETAILED DESCRIPTION OF THE INVENTION

The non-magnetic support of the present invention is preferably composed of at least 99 wt % of polyethylene terephthalate and may contain inorganic pigments (e.g., $CaCO_3$ and $SiO_2$). The cutting index (Z) of the non-magnetic support is 6 or lower and preferably 5 or lower, but generally −10 or higher and preferably −6 or higher.

Equation (1) was experimentally obtained by measuring the number of dust attached on a cut sectional surface of a video tape formed by cutting a bulk magnetic recording medium to the ½ inch width of a video tape.

In equation (1), the haze value A is related to the number of microvoids in the film. As the haze value increases, that is, as the number of microvoids having a size of 1 to 10 μm becomes higher, the load on the knife upon cutting becomes lower and cutting becomes easy. However, as the number of microvoids increases, the strength of the film decreases and a support having low strength is not satisfactory. Therefore, the haze value (%) is preferably from 2 to 10. The haze value is calculated by dividing the amount of scattered light Td by the total amount of transmitted light T, the Td and T being measured using a sphere method HTR meter manufactured by Nippon Seimitsu Kogaku Co., Ltd. in accordance with JIS K674, wherein the film is inserted in the sphere method HTR meter equipped with a G filter having a wavelength of 550 μm and liquid paraffin as a blank.

The surface orientation coefficient B is a value which shows the degree of how much the surface of the benzene ring of the polyethylene terephthalate is orientated in parallel with the film surface. As the surface orientation coefficient B increases, the Z value decreases, and the cutting capability of the film becomes excellent. As the surface orientation coefficient B decreases, that is, as the degree of how much the benzene ring surface is orientated in the direction vertical or perpendicular to the film surface increases, the cut surface of the film increasingly breaks off and the number of dust increases. As described above, the surface orientation coefficient B can be calculated from the refractive index in the machine direction of the film nMD, the refractive index in the transverse direction nTo and the refractive index in the thickness direction nzD. These refractive indexes can be measured by Abbe's refractometer using Na D-line as a light source.

It is preferred that the refractive index in the machine direction $n_{MD}$ be from 1.63 to 1.66, the refractive index in the traverse direction $n_{TD}$ be from 1.65 to 1.69, the refractive index in the thickness direction $n_{ZD}$ be from 1.48 to 1.51, and $\Delta n = n_{MD} - n_{TD}$ be from $-0.02$ to $-0.05$.

As the cutting index (Z) obtained from equation (1) becomes smaller, cutting capability becomes more excellent.

It is preferred that the non-magnetic support of this invention have a cutting crystal index (Y) of 6 or higher as defined by equation (2):

$$Y = -6.36 - 28.4X_i + 0.254X_c - 26\Delta n \qquad (2)$$

where $X_i$ is the ratio of $I(110)/I(100)$ measured by the X-ray diffractiometry, wherein $I(110)$ is a peak strength of the (110) surface, and $I(100)$ is a peak strength of the (100) surface; $X_c$ is the crystallite size, and $\Delta n$ has the same definition as described for equation (1).

Equation (2) was based on or obtained from the following experimentation where Y is shown in terms of the following numerical value. That is, cutting capability is defined by checking whether a bulk roll of the magnetic recording medium can be cut sharply or dull to prepare a ½ inch video tape and is evaluated in terms of numerals where the best cutting capability is identified as 7 and the worst is identified as 1.

In equation (2), $X_i$ is the value showing the degree of surface orientation of crystal and is the ratio of $I(110)/I(100)$ as measured by X-ray diffractiometry of the non-magnetic support. $X_i$ is preferably from 8 to 16.

$X_c$ is the crystallite size and can be obtained from the half width of the (200) surface as a result of X-ray diffractiometry of the non-magnetic support. $X_c$ is preferably from 40 to 60 Å.

$\Delta n$ has the same definition as for equation (1), and is preferably from $-0.02$ to $-0.05$.

A film mainly composed of polyethylene terephthalate having the cutting index (Z) of 6 or lower, and preferably having the cutting crystal index (Y) of 5.5 or higher, is novel, and can be prepared, for example, by the following method.

The above described film can be prepared by first stretching a film mainly composed of polyethylene terephthalate from 2 to 4 times long with a pair of rolls heated to 90° to 110° C. each having different rotating speed in the machine direction (extrusion direction from a molding machine), second, sending the film into a tenter while the film is clipped at both sides thereof, and stretching the film from 3 to 5 times wide in the transverse (width) direction at 90° to 120° C., and, then heating the film at from 200° to 250° C. for from 5 to 10 seconds while the film is shrunk from 2 to 8% in the transverse direction in the tenter.

Microvoids in the film and the haze value (A) can be increased by raising the temperature used on stretching the film in the machine direction and by increasing the stretching degrees in the machine direction and in the transverse direction. The haze value (A) can also be adjusted by varying the kind(s) and the amount(s) of fillers added into the film. For the purpose, calcium carbonate can be added in an amount of from 0.02 to 1 wt % based on the weight of polyethylene terephthalate. Further, the surface orientation coefficient (B) and $\Delta n$ can be adjusted by changing the stretching degrees in the machine direction and the transverse direction. For example, B increases and $\Delta n$ decreases when the stretching degree in the transverse direction is increased.

The properties of the non-magnetic support of this invention such as mechanical properties (e.g., thickness, tensile strength, and modulus of elasticity) or thermal properties (e.g., coefficient of heat shrinkage) can be those as are conventional in the art. In general, the thickness is from 7 to 60 μm, the modulus of elasticity is from 300 to 600 kg/mm², and the coefficient of heat shrinkage is from 0.02 to 0.5% when heated at 80° C. for 30 minutes.

In the magnetic recording medium of this invention, it is necessary that the magnetic layer provided on the surface of the non-magnetic support have yield elongation (L) of 10% or lower, preferably 6% or lower, and the energy (E) to reach to the yield point be 1.0 kg/mm² or lower, preferably 0.7 kg/mm² or lower.

The mechanical characteristics of the magnetic layer of this invention can be measured by a tensile machine (e.g., a tensile machine "STM-T-50BP", manufactured by Toyo Boldwin Co., Ltd.). This test is done at 23° C., at 70% RH and at a stress rate of 10%/min.

It is difficult to directly remove a magnetic layer from a magnetic recording medium. Therefore, values of the stress-strain characteristics of the magnetic layer is obtained by obtaining the value of stress-strain characteristics of the whole magnetic recording medium, then obtaining the value of stress-strain characteristics of the non-magnetic support (including the non-magnetic support provided with a backing layer, if present) having removed therefrom only the magnetic layer, and finally subtracting the value of the stress-strain characteristics of the non-magnetic support from that of the whole magnetic recording medium.

The value of stress-strain characteristics can be calculated by the following equation.

$$Em = (Ft - Fb)/l.dm.w$$

wherein Em is the modulus of elasticity of the magnetic layer, dm is the thickness of the magnetic layer, w is the width of the support (=that of the magnetic layer=that of the magnetic tape), l is the extensibility (%) of the support (=that of the magnetic layer=that of the magnetic tape), and Fb and Ft are the tensile stress of the support and the tensile stress of the magnetic tape, respectively.

The figure showing the stress-strain curve will be explained. In the figure point A is the yield point, the strain to reach the yield point is the yield elongation in tensile (L), and the energy necessary for reaching the yield point, that is, the shaded portion E, is the energy (E) to reach the yield point.

The energy (E) to reach the yield point of the magnetic layer corresponds to the heat energy consumed by the magnetic recording medium and a knife upon cutting the magnetic recording medium. That is, as the energy (E) is smaller, cutting is easier and the knife is less worn. When the yield elongation (L) is large, the magnetic layer itself deforms upon cutting and cutting is delayed, which means that the period of time and the area where the magnetic layer contacts the knife increase, thereby accelerating knife wear. In this case, the magnetic layer is damaged over a wide area, and, as a result, the cut surface becomes irregular (uneven) and a great amount of dust formed.

On the other hand, when the energy (E) to reach the yield point of the magnetic layer and the yield elongation (L) of the magnetic layer are too low, the mechanical strength of the magnetic layer decreases, softness is reduced, and the characteristics necessary for a magnetic recording medium, such as running durability or electromagnetic characteristics, are undesirably decreased. Therefore, the energy (E) is generally from 0.2 to 1.0 kg/mm², preferably from 0.3 to 0.7 kg/mm², and the yield elongation (L) is generally from 0.5 to 10%, preferably from 1 to 6%.

The values of yield elongation and the energy to reach the yield point can optionally be changed by adjusting the composition ratios and the compounding amounts of the binder used for the magnetic coating composition for forming the magnetic layer. The binder is generally contained in an amount of 10 to 45 parts by weight (as a solid) per 100 parts by weight of magnetic particles in the magnetic coating composition. The binder is generally composed of a first component such as a vinyl chloride type resin(s), or a cellulose derivative(s) having good dispersibility, a second component such as a polyester resin(s), polyurethane resin(s), epoxy resin(s) or a copolymer of butadiene and acrylonitrile (which have good plasticity), and a third component—a cross-linking agent—such as a polyisocyanate.

Examples of polyisocyanate include isocyanates, for example, tolylene diisocyanate, 4,4'-diphenylmethane diisocyanate, hexamethylene diisocyanate, xylylene diisocyanate, naphthylene-1,5-diisocyanate, o-tuluidine diisocyanate, isophorone diisocyanate, and triphenylmethane triisocyanate; reaction products of these isocyanates and polyalcohols; and polyisocyanates formed by the condensation of isocyanates. These polyisocyanater are commercially available under the trade names of, for example, Collonate L, Collonate HL, Collonate 2,030, Collonate 2,031, Millionate MR, Millionate MTL (manufactured by Nippon Polyurethan Co.), Takenate D-102, Takenate D-110N, Takenate D-200, Takenate D-202 (manufactured by Takeda Yakuhin Co.), Dismodur L, Dismodur IL, Dismodur N, Dismodur HL (manufactured by Sumitomo Bayer Co.), etc., which may be used alone or in a combination of two or more of them utilizing the difference in curing reactivity.

When the composition ratio of the second component is high, the yield elongation becomes small. The energy to reach the yield point can be changed by varying the yield elongation and/or the position of the yield point as shown in the figure. When the ratio of the first component is made high or the reaction of the cross-linking agent is increased, for example, by adding a catalyst(s) (e.g., dibutyl tin laurate), or raising the temperature of the heat treatment, the yield point is made high. When contrary to the above, the yield point is made low. The binder is preferably composed of from 25 to 70 wt % of the first component, from 15 to 65 wt % of the second component and from 20 to 50 wt % of the third component (cross-linking agent) based on the total amount of the first, second and third components (solid basis). Thus, a magnetic layer having desired values of the yield elongation and the energy to reach the yield point can easily be prepared by suitably adjusting the composition ratio of the binder for the magnetic layer.

The magnetic coating composition is coated on the non-magnetic support to form a magnetic layer preferably having a thickness of from 2 to 8 μm.

The feature of the magnetic recording medium of this invention resides in the combination of a predetermined novel non-magnetic support and a magnetic layer having predetermined properties, and as to other points, conventional techniques for preparing a magnetic recording medium can be used. For example, a backing layer may be present or absent on the surface of the non-magnetic support opposite the magnetic layer, and the ferromagnetic particles, binders used for the magnetic layer and the backing layer, antistatic agents, dispersants abrasive agents, lubricants and other materials (e.g., carbon black) can be conventional ones known in the art, and can be used in generally conventional amounts. The method for preparing the magnetic recording medium can be a conventional one known in the art.

The ferromagnetic fine powder usable in the present invention include known ferromagnetic fine powders such as $\gamma$-$Fe_2O_3$, Co-containing $\gamma$-$Fe_2O_3$, $Fe_3O_4$, Co-containing $Fe_3O_4$, $\gamma$-$FeO_x$, Co-containing $\gamma$-$FeO_x$ wherein $1.33 \leq x \leq 1.50$, $CrO_2$, Co-Ni-P alloy, Co-Ni-Fe-B alloy, Fe-Ni-Zn alloy, Ni-Co alloy, Co-Ni-Fe alloy, etc. Specifically, they are described, for example, in Japnese Patent Publication Nos. 14090/69, 18372/70, 22062/72, 22513/72, 28466/71, 38755/81, 4286/72, 12422/72, 17284/72, 18509/72, 18573/72, 10307/64, 29280/73, 39639/73, 29605/83, and 44254/85, Japanese Patent Application (OPI) No. 126605/84, U.S. Pat. Nos. 3,026,215, 3,031,341, 3,100,194, 3,242,005, and 3,389,014. The ferromagnetic particles have an average particle size of from about 0.01 to 1 μm, a ratio of long axis/width axis of from 1/1 to 50/1, and a specific surface area of from 1 to 60 m²/g. Prior to dispersion, dispersing agents, lubricating agents and antistatic agents may be absorbed on the surface of ferromagnetic particles by impregnating ferromagnetic particles in a solvent. In addition, hexagonal tabular barium ferrite may also be used.

Examples of the abrasive agents include $\alpha$-alumina, fused alumina, chromium oxide, corundum, $\alpha$-iron oxide, silicon nitride, boron nitride, silicon carbide, molybdenum carbide, boron carbide, tungsten carbide, diatom earth, and dolomite which have a Moh's hardness of 6 or more and an average particle size of from 0.01 to 5 μm. These abrasive agents may be used alone or in combination and are used in an amount of from 0.01 to 20 parts by weight based on 100 parts by weight of the binder.

In the present invention, carbon black can be incorporated into the magnetic layer and furnace carbon black for rubber, thermal carbon black for rubber, color carbon black, or acetylene carbon black can be used as the carbon black. Specific example of abbreviation of the carbon blacks in the U.S. include SAF, ISAF, IISAF, T, HAF, SPF, FF, FEF, HMF, GPF, APF, SRF, MPF, ECF, SCF, CF, FT, MT, HCC, HCF, MCF, LFF, RCF, etc. and those classified in ASTM Standard D-1765-82a can be used. The carbon black used in the present invention preferably has an average grain size of from about 10 to 1,000 mμ (as determined by an electron microscope), a specific surface area of from about 1 to 800 m²/g determined by the nitrogen adsorption method, a pH value of from about 6 to 11

(according to JIS K-6221-1982), and a dibutylphthalate (DBP) oil adsorption amount of from 10 to 400 ml/100 g (according to JIS K-6221-1982). The grain size of the carbon black used in the present invention is preferably from 10 to 100 mμ for reducing the surface electric resistance of the coated film, and from 50 to 1,000 mμ for controlling the strength of the coated film. Further, the carbon black of fine particles (100 mμ or less) can be used for smoothing to reduce spacing loss, and carbon black of coarse grains (50 mμ or more) is used with an aim of roughening the surface to reduce the friction coefficient. Thus, the kind and the addition amount of the carbon black used are dependent on the purpose required for the magnetic recording medium.

Further, the carbon black may be used after the surface treating with the dispersant described later, or being grafted with resins. Further, these carbon blacks partially graphitized at the surface thereof by treatment at a temperature of 200° C. or more in a furnace upon producing carbon black may also be used. Furthermore, hollow carbon black may specially be used. It is preferred that the carbon black be used in an amount from about 0.1 to 20 parts by weight per 100 parts by weight of the fine ferromagnetic powder in the magnetic layer. Carbon blacks which can be used in the present invention are described in Carbon Black Binran (Manual for Carbon Black), edited by Carbon Black Association (1971).

The lubricant usable for the magnetic layer in the present invention can include, for example, silicone oil, graphite, molybdenum disulfide, boron nitride, graphite fluoride, fluorinated alcohol, polyolefin (e.g., polyethylene wax, etc.), polyglycol (e.g., polyethylene oxide wax, etc.), alkyl phosphate ester, polyphenyl ether, tungsten disulfide, a fatty acid ester formed of a monohydric fatty acid ester having from 10 to 20 carbon atoms and one or more of mono-valent, di-valent, tri-valent, tetra-valent and hexa-valent alcohols having from 3 to 12 carbon atoms, and fatty acid esters formed of mono-basic fatty acids having from 10 or more carbon atoms and mono-valent to hexa-valent alcohols having a number of carbon atoms providing the total number of carbon atoms of from 11 to 28. Fatty acids, fatty acid amides, and fatty acid alcohols each having from 8 to 22 carbon atoms may also be used. Specific examples of the organic compound lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol, lauryl alcohol, etc.

As the lubricant for use in the present invention, conventional lubricant oil additives may also be used, and examples thereof include anti-oxidants (alkyl phenols, etc.), rust inhibitors (naphthenic acid, alkenyl succinic acid, dilauryl phosphate, etc.), oilly agents (rapeseed oil, lauryl alcohol, etc.), extreme pressure agents (dibenzyl sulfide, tricresyl phosphate, tributyl phosphite, etc.), cleaning dispersants, viscosity index improvers, flow point depressants, defoaming agents, etc. These lubricants are preferably added in an amount of from about 0.05 to 20 parts by weight per 100 parts by weight of the ferromagnetic powder. These agents are described e.g., in Japanese Patent Publication Nos. 238898/68, 24041/73, 18482/73, 18221/69, 28043/72, and 56132/82, U.S. Pat. Nos. 3,423,233, 3,470,021, 3,492,235, 3,497,411, 3,523,086, 3,625,760, 3,630,772, 3,634,253, 3,642,539, 3,687,725 and 4,135,031, and IBM Technical Disclosure Bulletin vol 9, No. 7, p 779 (December 1966).

The dispersant usable in the present invention can include fatty acids having from 10 to 22 carbon atoms such as caprylic acid, capric acid, lauric acid, myristic acid, palmitic acid, stearic acid, oleic acid, elaidic acid, linoleic acid, linolenic acid, stearolic acid ($R_1$COOH in which $R_1$ represents an alkyl group having from 9 to 21 carbon atoms), alkali metal soaps thereof (Li, Na, K, etc.) alkaline earth metal soaps thereof (Mg, Ca, Ba, etc.), Cu, Pb, etc. soaps of the fatty acids described above; lecithin, etc. In addition, higher alcohols having 4 or more carbon atoms, such as butanol, octanol, myristyl alcohol, stearyl alcohol, as well as sulfate esters and phosphate esters thereof may also be used. The dispersant is preferably added in an amount of from about 0.005 to 20 parts by weight per 100 parts by weight of the binder. The dispersant may be previously deposited on the surface of the fine ferromagnetic powder or the fine non-magnetic powder, or added during dispersing the coating composition. These agents are described, for example, in Japanese Patent Publication Nos. 28639/64, 17945/69, 18221/69, 39402/74, 15001/73, and U.S. Pat. No. 3,387,993 and 3,470,021.

The antistatic agent usable in the present invention can include, for example, an electroconductive powders such as graphite, carbon black, carbon black graft polymer; natural surface active agents such as saponin; non-ionic surface active agents such as alkylene oxides, glycerins, glycidols, polybasic alcohols, polybasic alcohol esters, alkylphenol ethylene oxide addition products; cationic surface active agents such as higher alkyl amines, cyclic amines, hydantoin derivatives, amide amines, ester amides, quarternary ammonium salts, pyridine and other heterocyclic compounds, and phosphoniums or sulfoniums; anionic surface active agents containing acidic groups such as carboxylic, sulfonic phosphoric, sulfate, and phosphorate groups; amino acids; amphoteric surface active agents such as amino sulfonic acids, sulfuric acid or phosphoric acid esters of amino alcohols, and alkyl betaines. Examples of the surface active agent compound usable as the antistatic agents are disclosed, for example, in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Patents 1,077,317 and 1,198,450, as well as Ryohei Oda, *Kaimennkasseizai no Gosei to sono Oyo* (Synthesis and Application of Surface Active Agent), (Maki Shoten 1972); A. W. Baily *Surface Active Agents* (Inter Science Publication Corporated 1985); *Encyclopedia of Surface Active Agents*, vol. 2, (Chemical Publishing Company 1964); *Kaimenkasseizai Binran* (Surface Active Agent Manual), (6th edition, Sagyo Tosho Co., Dec. 20, 1966); and Hideo Marushige, *Taiden Boshizai* (Antistatic Agent) (Miyuki Shobo 1968), etc.

These surface active agents may be added alone or in combination. These agents are used as an antistatic agent, but may often be used for other purposes, for example, improvement in dispersibility, magnetic properties, and lubricating properties, and as coating assistants.

The coating solution for a magnetic layer is prepared basically by dissolving the desired binder in a solvent which is capable of dissolving the binder, adding ferromagnetic particles together with the above described components to the resulting solution, stirring and homogeneously dispersing the solution.

The organic solvent used in the present invention, used for dispersing, kneading, and coating, can include ketones such as acetone, methyl ethyl ketone, methyl isobutyl ketone, cyclohexanone, and isophorone; alcohols such as methanol, ethanol, propanol, butanol, isobutanol, isopropanol, and methyl cyclohexanol; esters such as methyl acetate, ethyl acetate, butyl acetate, isobutyl acetate, isopropyl acetate, and ethyl lactate glycol monoethylether acetate; ethers such as diethyl ether, tetrahydrofuran, glycol dimethyl ether, glycol monoethyl ether and dioxane; tar type aromatic hydrocarbons such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; N,N-dimethyl formaldehyde; and hexane.

There is no particular restriction in the present invention for the method of kneading and dispersing, and the order of adding each of the ingredients is not limited. The magnetic coating composition can be prepared by using a conventional kneader, for example, a 2-roll mill, a 3-roll mill, a ball mill, a pebble mill, a tron mill sand grinder, a Szegvari attritor, a high speed impeller, a disperser, a high speed stone mill, a high speed impact mill, a disper, a kneader, a high speed mixer, a ribbon blender, a kneader, an intensive mixer, a tumbler, a blender, a disperser, a homogenizer, a single-axis screw extruder, a double-axis screw extruder, and a ultrasonic wave disperser. Details of the techniques of kneading and dispersing are described, for example, in T. C. Patton *Paint Flow and Pigment Dispersion (John Wiley & Sons* 1964), *Kogyo ZairVo* (Industrial Material) Vol. 25, 37 (1977) by Shinichi Tanaka, and publications cited therein. They are further described in U.S. Pat. Nos. 2,581,414 and 2,855,156. In the present invention, the magnetic coating composition can be prepared by kneading and dispersing in accordance with the methods as described in these publications.

As the method of coating the coating composition the magnetic recording layer onto the support, there can be used air doctor coating, blade coating, air knife coating, squeeze coating, dip coating, reverse roll coating, transfer roll coating, gravure coating, kiss coating, cast coating, and spray coating, as well as other methods. These methods are specifically described e.g., in *Coating Kogaku* (Coating Technology), pages 253 to 277 (Asakura Shoten, Mar. 20, 1971).

After the magnetic layer is coated on a support by such a method, the magnetic powder in the layer is magnetically oriented by a conventional method as required while drying, and then the formed magnetic layer is dried. The conveying speed for the support in this case is usually from about 10 to 500 m/min and the drying temperature is usually controlled to from about 20° to 120° C.

The magnetic recording medium according to the present invention is prepared by further applying surface smoothing techniques or cutting into a desired shape as required. These processes are described, for example, in Japanese Patent Publication 23635/65 and 28368/64, and U.S. Pat. No. 3,473,960, Further, the methods described in Japanese Patent Publication 13181/67 which is a fundamental and important techniques in the relevant field of art can also be applied to the present invention.

The present invention will be illustrated more specifically by the following Examples and Comparative Examples, wherein all parts are by weight.

Preparation of a magnetic coating composition

Various magnetic coating compositions were prepared in the following manner to obtain magnetic layers for a magnetic recording medium having various yield elongation values and energy values to reach the yield point.

Magnetic coating composition 1

A part of the following composition was put in a ball mill, sufficiently mixed and kneaded, and the rest of the composition was added in the ball mill and sufficiently mixed and kneaded. 13 parts of polyisocyanate ("Desmodule L-75" manufactured by Bayer Co., Ltd.) was then added and unformly dispersed to prepare a magnetic coating composition.

| | |
|---|---|
| Co-containing $\gamma$-Fe$_2$O$_3$ particles (Nitrogen adsorption specific surface area: 31 m$^2$/g, Hc: 650 Oe) | 100 parts |
| Copolymer of vinyl chloride (VC), vinyl acetate (VA) and maleic acid (MA) ("VMCH", manufactured by Union Carbide Co., Ltd.; number average molecular weight (Mn): 21,000; VC/VA/MA = 86/13/1 by weight) | 10 parts |
| Polyurethane resin ("Nipporan N2304", manufactured by Nippon Polyurethane Co., Ltd.; Mn 34,000) | 14 parts |
| Carbon black (average particle size: 15 m$\mu$) | 10 parts |
| Lecithin | 0.1 part |
| Oleic acid | 0.5 part |
| Butyl myristate | 1 part |
| Myristic acid | 2 parts |
| Butyl acetate | 150 parts |
| Methyl ethyl ketone | 60 parts |

Magnetic costing composition 2

A part of the following composition was put in a ball mill, sufficiently mixed and kneaded, and the rest of the composition was added into the ball mill, sufficiently mixed and kneaded. 12 parts of polyisocyanate ("Desmodule L-75") was then added thereto and dispersed to prepare a magnetic coating composition.

| | |
|---|---|
| Co-containing $\gamma$-Fe$_2$O$_3$ particles (Nitrogen adsorption specific surface area: 31 m$^2$/g, Hc: 650 Oe) | 100 parts |
| Copolymer of vinyl chloride, vinyl acetate and maleic acid ("VMCH") | 17 parts |
| Polyurethane resin ("Nipporan N2304") | 17 parts |
| Carbon black (average particle size: 15 m$\mu$) | 10 parts |
| Lecithin | 0.1 part |
| Oleic acid | 0.5 part |
| Butyl myristate | 1 part |
| Myristic acid | 2 parts |
| Butyl acetate | 150 parts |
| Methyl ethyl ketone | 60 parts |

Magnetic coating composition 3

A part of the following composition was put in a ball mill, sufficiently mixed and kneaded, and the rest of the composition was added into the ball mill, sufficiently mixed and kneaded. 7 parts of polyisocyanate ("Desmodule L-75") was then added thereto and uniformly dispersed to prepare a magnetic coating composition.

| | |
|---|---|
| Co-containing γ-$Fe_2O_3$ particles (Nitrogen adsorption specific surface area: 31 $m^2$/g, Hc: 650 Oe) | 100 parts |
| Copolymer of vinyl chloride, vinyl acetate and maleic acid ("VMCH") | 10 parts |
| Polyurethane resin ("Nipporan N2304") | 34 parts |
| Carbon black (average particle size: 15 mμ) | 10 parts |
| Lecithin | 0.1 part |
| Oleic acid | 0.5 part |
| Butyl myristate | 1 part |
| Myristic acid | 2 parts |
| Butyl acetate | 150 parts |
| Methyl ethyl ketone | 60 parts |

Magnetic coating composition 4

A part of the following composition was put in a ball mill, sufficiently mixed, kneaded, and the rest of the composition was added into the ball mill, sufficiently mixed and kneaded. 10 parts of polyisocyanate ("Dismodule L-75") was added thereto, and uniformly dispersed to prepare a magnetic coating composition.

| | |
|---|---|
| Co-containing γ-$Fe_2O_3$ particles (Nitrogen adsorption specific surface area: 42 $m^2$/g, Hc: 850 Oe) | 100 parts |
| Vinyl chloride type resin with sulfonic acid groups (content of $SO_3Na$ group: $6 \times 10^{-5}$ equivalent per 1 g of polymer, Mn = 30,000) | 12 parts |
| Polyurethane resin having a carboxylic groups (content of COOH group: $4 \times 10^{-5}$ equivalent per 1 g of polymer, Mn = 30,000) | 15 parts |
| Carbon black (average particle size: 15 mμ) | 1 parts |
| Oleic acid | 0.5 part |
| Octyl laurate | 1 part |
| Lauric acid | 1.5 parts |
| Butyl acetate | 170 parts |
| Methyl ethyl ketone | 70 parts |

Preparation of a non-magnetic support

Non-magnetic supports (films) mainly composed of polyethylene terephthalate having various cutting indexes and having a 15 μm thickness were prepared in the following manner.

Film 1

(a) Preparation of polyester

Into the mixture of dimethyl terephthalate and ethylene glycol in an equivalent mole amount, 0.08 wt % of calcium acetate, 0.15 wt % of lithium acetate, 0.04 wt % of antimony oxide, 0.15 wt % of trimethyl phosphate and 0.03 wt % of calcium carbonate having an average particle size of 1.1 μm were added, and the system was polymerized and condensed in a conventional manner to prepare polyester.

(b) Preparation of polyester film

The polyester thus obtained in (a) was dried and formed into an unstretched sheet using an extrusion molding machine. The sheet was stretched by rolls at a film temperature of 100° C. (measured by an infrared thermometer) in the longitudinal (extruding) direction by 3.2 times magnification and then stretched at a film temperature of 110° C. in the transverse direction while the sheet was clipped at the both edges thereof in a tenter under 3.7 times magnification and subsequently heated at 205° C. for 10 seconds while the sheet was shrunk in the transverse direction by 5% to obtain polyester film 1.

Film 2

By following the same procedure as in the preparation of film 1, polyester film 2 was obtained except that the polyester was prepared using 0.5 wt % of calcium carbonate instead of 0.03 wt % thereof, and the stretching magnification in the transverse direction was 3.9 times instead of 3.7 times.

Film 3

By following the same procedure as in the preparation of film 1, polyester film 3 was obtained except that the polyester was prepared using 0.08 wt % of calcium carbonate instead of 0.03 wt % thereof, and the stretching magnification in the transverse direction was 4.4 times instead of 3.7 times.

The cutting index Z, the cutting crystal index Y, values of A, B and Δn in equation (1) for films 1, 2 and 3 are shown in Table 1. Those values were measured in accordance with the ealier disclosure.

EXAMPLE 1

Magnetic coating composition 1 was coated on film 3 in a dry thickness of 4.2 μm, provided with magnetic orientation, dried and calendered to prepare a magnetic recording medium. The thus obtained bulk roll thereof was cut to a ½ inch width to prepare a magnetic tape. The results of evaluation of this tape are shown in Table 1. The values of the yield elongation (L) and the energy (E) to reach the yield point of the magnetic layer are also shown in Table 1.

EXAMPLE 2

By following the same procedure as in Example 1, a magnetic tape was prepared except that magnetic coating composition 4 was used instead of magnetic coating composition 1. The characteristics values and the results of evaluation of that tape are shown in Table 1.

COMPARATIVE EXAMPLES 1 TO 4

By following the same procedure as in Example 1, a magnetic tape was prepared except that the magnetic coating composition and the film used were as shown in Table 1. The characteristics values and the results of evaluation on the tapes are shown in Table 1.

In Table 1, the "powder-off" and the "edge stain" values were evaluated in the following manner.

"Powder-off"

Using a VHS type VTR ("NV-8300", manufactured by Matsushita Electric Industrial Co., Ltd.), a test tape of a full length of 2 hours was run for 1000 passes, and the state of stain on the audio and control head and a pole in the desk and the cassette half was observed and evaluated on a five level basis, assuming that the state of no stain was identified as 5 (full mark).

"Edge stain"

An unwoven cloth was pressed against an edge of the tape upon rewinding the video tape, and the state of stain was observed, and evaluated in this order: A, B, C, D and E. "A" means the best.

TABLE 1

| | Magnetic coating composition | Film | E (kg/mm$^2$) | L (%) | Z | A (%) | B | $\Delta n$ ($\times 10^{-3}$) | Y | $X_i$ ($\times 10^{-2}$) | $X_c$ (Å) | Powder off | Edge stain |
|---|---|---|---|---|---|---|---|---|---|---|---|---|---|
| Example 1 | 1 | 3 | 0.223 | 4 | 1.8 | 3.77 | 0.1652 | −48.4 | 6.4 | 8.1 | 54.3 | 4.5 | A |
| Example 2 | 4 | 3 | 0.191 | 2.7 | 1.8 | 3.77 | 0.1652 | −48.4 | 6.4 | 8.1 | 54.3 | 5 | A |
| Comparative Example 1 | 2 | 3 | 1.1 | 7.5 | 1.8 | 3.77 | 0.1652 | −48.4 | 6.4 | 8.1 | 54.3 | 3 | C |
| Comparative Example 2 | 3 | 3 | 0.65 | 16 | 1.8 | 3.77 | 0.1652 | −48.4 | 6.4 | 8.1 | 54.3 | 2 | D |
| Comparative Example 3 | 1 | 2 | 0.216 | 5 | 7.1 | 9.66 | 0.1647 | −42.8 | 6.5 | 8.6 | 57.6 | 1.5 | C |
| Comparative Example 4 | 1 | 1 | 0.214 | 5 | 55.3 | 2.30 | 0.1577 | −7.4 | 1.4 | 12.5 | 43.9 | 1.5 | D |

It is clear from the results shown in Table 1 that an excellent magnetic recording medium in tape shape cannot be obtained if the characteristic values of the non-magnetic support and of the magnetic layer are not within the ranges as defined herein.

Specifically, when the characteristic values of the magnetic layer are outside the range as defined herein, even though the characteristic values of the non-magnetic support meet the requirements of this invention, a magnetic tape having good cut surface cannot be obtained characteristic values of the non-magnetic support are outside the range as defined herein, although the characteristic values of the magnetic layer meet the requirements of this invention, a magnetic tape having good cut surface cannot be obtained (Comparative Examples 3 and 4).

When a magnetic recording medium of this invention is cut, for example, by a shear cutting method, to prepare a magnetic recording tape, the cut surface is very neat, and powder-off, edge damage, drop out and the like hardly take place. Thus, in accordance with this invention, an excellent magnetic recording medium having good electromagnetic characteristics and running durability can be obtained.

A knife used when a magnetic recording medium of this invention is cut is hardly worn, and therefore, the knife can be continuously used for a long period of time and a magnetic recording tape can be manufactured with high efficiencies.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having coated thereon a magnetic layer, the non-magnetic support being a film substantially composed of polyethylene terephthalate and having a cutting index (Z) of 6 or less as defined by equation (1):

$$Z = 383.3 - 2.76A - 2000B + 840\Delta n \quad (1)$$

wherein A is the haze value, B is the surface orientation coefficient represented by $\{(n_{MD}+n_{TD})/2\} - n_{ZD}$, $n_{MD}$ is the refractive index in the machine direction, $n_{TD}$ is the refractive index in the transverse direction, $n_{ZD}$ is the refractive index in the thickness direction, and $\Delta n$ is the difference of the refractive indices represented by $n_{MD} - n_{TD}$;

and said magnetic layer has yield elongation (L) of 10% or lower and requires energy (E) of 1.0 kg/mm$^2$ or less to reach the yield point.

2. The magnetic recording medium as claimed in claim 1, wherein the cutting index (Z) of said nonmagnetic support is 5 or lower.

3. The magnetic recording medium as claimed in claim 1, wherein the haze value (A) of said non-magnetic support is in the range of from 2 to 10%.

4. The magnetic recording medium as claimed in claim 1, wherein the surface orientation coefficient (B) is from 0.15 to 0.17.

5. The magnetic recording medium as claimed in claim 1, wherein the refractive index in the machine direction is from 1.63 to 1.66, the refraction index in the transverse direction is from 1.65 to 1.69, the refractive index in the thickness direction is from 1.48 to 1.51, and the difference $\Delta n$ of the refractive indices is from −0.02 to −0.05.

6. The magnetic recording medium as claimed in claim 1, wherein the said non-magnetic support is a biaxially orientated film.

7. The magnetic recording medium as claimed in claim 1, wherein the yield elongation is 10% or lower.

8. The magnetic recording medium as claimed in claim 1, wherein the energy to reach the yield point is 0.7 kg/mmz or lower.

9. The magnetic recording medium as claimed in claim 1, wherein said non-magnetic support has a cutting crystal index (Y) of 6 or higher as defined by the equation (2):

$$Y = -6.36 - 28.4X_i + 0.254X_c - 26\Delta n \quad (2)$$

where $X_i$ is the ratio of I(110)/I(100) wherein I(110) is the X-ray diffraction peak strength of the (110) surface, and I(100) is the X-ray diffraction peak strength of the (100) surface; $X_c$ is the crystallite size, and $\Delta n$ has the same definition as in equation (1).

* * * * *